United States Patent
Tang

(10) Patent No.: US 10,841,901 B2
(45) Date of Patent: Nov. 17, 2020

(54) INTER-DEVICE COMMUNICATION METHOD AND APPARATUS

(71) Applicant: GUANGDONG OPPO MOBILE TELECOMMUNICATIONS CORP., LTD., Dongguan, Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 73 days.

(21) Appl. No.: 16/080,449

(22) PCT Filed: May 12, 2016

(86) PCT No.: PCT/CN2016/081863
§ 371 (c)(1),
(2) Date: Aug. 28, 2018

(87) PCT Pub. No.: WO2017/193334
PCT Pub. Date: Nov. 16, 2017

(65) Prior Publication Data
US 2019/0069272 A1   Feb. 28, 2019

(51) Int. Cl.
H04W 72/02   (2009.01)
H04W 72/10   (2009.01)
(Continued)

(52) U.S. Cl.
CPC ............ *H04W 72/02* (2013.01); *H04W 4/70* (2018.02); *H04W 72/0446* (2013.01); *H04W 72/0453* (2013.01); *H04W 72/10* (2013.01)

(58) Field of Classification Search
None
See application file for complete search history.

(56) References Cited

U.S. PATENT DOCUMENTS

| | | |
|---|---|---|
| 9,215,693 B2 | 12/2015 | Ahn et al. |
| 2013/0114531 A1 | 5/2013 | Ahn et al. |

(Continued)

FOREIGN PATENT DOCUMENTS

| | | |
|---|---|---|
| CN | 102056319 A | 5/2011 |
| CN | 102752070 A | 10/2012 |

(Continued)

OTHER PUBLICATIONS

Alcatel-Lucent Shanghai Bell et al: "Support for PC5 priority", 3GPP Draft; R1-154599—Priorities, 3rd Generation Partnership Project (3GPP), Mobile Competence Centre; 650, Route Des Lucioles; F-06921 Sophia-Antipolis Cedex; France, vol. RAN WG1, No. BeiJing, China; Aug. 24, 2015-Aug. 28, 2015 Aug. 23, 2015 (Aug. 23, 2015), XP051039515, Retrieved from the Internet: URL:http://www.3gpp.org/ ftp/Meetings_3GPP_ SYNC/RAN1/ Docs/ [retrieved on Aug. 23, 2015] *Chaper 3. Priority support for direct communication; figure 9 *.

(Continued)

*Primary Examiner* — Saumit Shah

(57) ABSTRACT

Provided are an inter-device communication method and apparatus, the method including: a first terminal device obtains a first time frequency resource, the first time frequency resource being a time frequency resource used for transmitting data of a first service, the first service being an inter-device communication service; the first terminal device sends data of a second service according to the first time frequency resource, the second service being an inter-device communication service. The present invention is capable of increasing the flexibility and reliability of inter-device communication.

18 Claims, 2 Drawing Sheets

200

A first terminal device acquires a first time-frequency resource, the first time-frequency resource being a time-frequency resource for transmitting data of a first service and the first service being a D2D communication service — S210

The first terminal device sends data of a second service with the first time-frequency resource, the second service being a D2D communication service — S220

(51) Int. Cl.
*H04W 4/70* (2018.01)
*H04W 72/04* (2009.01)

(56) References Cited

U.S. PATENT DOCUMENTS

| | | | |
|---|---|---|---|
| 2017/0071019 A1 | | 3/2017 | Wakabayashi et al. |
| 2018/0167914 A1* | | 6/2018 | Zhang .................. H04W 72/02 |
| 2019/0124651 A1* | | 4/2019 | Xu ........................ H04W 72/04 |

FOREIGN PATENT DOCUMENTS

| | | | |
|---|---|---|---|
| CN | 102904665 A | 1/2013 |
| CN | 103457708 A | 12/2013 |
| CN | 103581093 A | 2/2014 |
| CN | 103813458 A | 5/2014 |
| CN | 104469955 A | 3/2015 |
| CN | 104541471 A | 4/2015 |
| CN | 104937873 A | 9/2015 |
| CN | 105517168 A | 4/2016 |
| WO | 2015128134 A1 | 9/2015 |
| WO | 2016022649 A1 | 2/2016 |

OTHER PUBLICATIONS

Supplementary European Search Report in European application No. 16901289.5, dated Jan. 28, 2019.

English Translation of the Written Opinion of the International Search Authority in international application No. PCT/CN2016/081863, dated Feb. 3, 2017.

International Search Report in international application No. PCT/CN2016/081863, dated Feb. 3, 2017.

Written Opinion of the International Search Authority in international application No. PCT/CN2016/081863, dated Feb. 3, 2017.

Nokia, Alcatel Lucent Shanghai Bell, On resource pool design[online], 3GPP TSG-RAN WG1#84b R1-162541, <URL:http://www.3gpp.org/ftp/tsg_ran/WG1_RL1/TSGR1_84b/Docs/R1-162541.zip>, issued on Apr. 15, 2016, pp. 1-4.

InterDigital Communications, Support of different priorities for D2D communication[online], 3GPP TSG-RAN WG1#82 R1-154730, <URL:http://www.3gpp.org/ftp/tsg_ran/WG1_RL1/TSGR1_82/Docs/R1-154730.zip>, issued on Aug. 28, 2015, pp. 1-5.

Oppo, Discussion on SPS Enhancements for V2V[online], 3GPP TSG-RAN WG2#93bis R2-162197, <URL:http://www.3gpp.org/ftp/tsg_ran/WG2_RL2/TSGR2_93bis/Docs/R2-162197.zip>, issued on Aug. 15, 2016, pp. 1-3.

First Office Action of the Japanese application No. 2018-549508, dated Dec. 24, 2019.

Office Action of the Indian application No. 201817037556, dated Jun. 11, 2020.

First Office Action of the Chinese application No. 201680082715.3, dated Jul. 1, 2020.

First Office Action of the Taiwanese application No. 106115186, dated Aug. 24, 2020.

First Office Action of the European application No. 16901289.5, dated Jul. 9, 2020.

Second Office Action of the Chinese application No. 201680082715.3, dated Sep. 23, 2020.

* cited by examiner

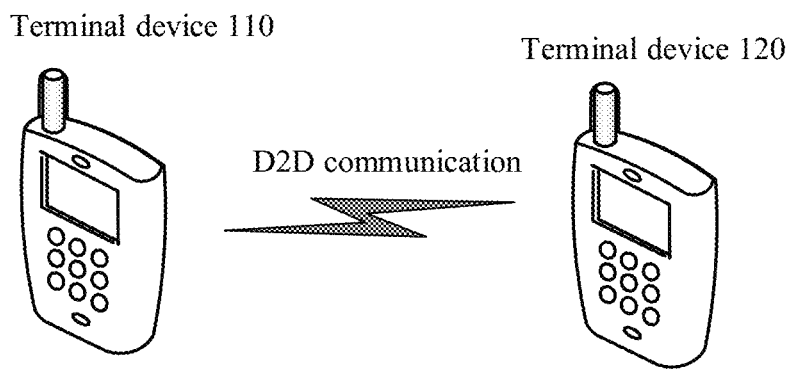

A first terminal device acquires a first time-frequency resource, the first time-frequency resource being a time-frequency resource for transmitting data of a first service and the first service being a D2D communication service  ⟶ S210

The first terminal device sends data of a second service with the first time-frequency resource, the second service being a D2D communication service  ⟶ S220

FIG. 2

INTER-DEVICE COMMUNICATION METHOD AND APPARATUS

TECHNICAL FIELD

The disclosure relates to the field of communication, and more particularly to a method and apparatus for Device-to-Device (D2D) communication.

BACKGROUND

Along with development of the communication technologies, inter-device communication technologies, for example, the D2D communication technology or the Vehicle to Vehicle (V2V) communication technology, has become a hot field for development of wireless communication technologies.

At present, a D2D communication solution for terminal devices is that, to when a D2D communication service emerges, a time-frequency resource for transmitting the service is determined by scheduling at a base station or by contention or the like, and the service is transmitted with the determined time-frequency resource.

Along with increasingly diversification of services implemented by using the D2D communication technology, services with a relatively high requirement on a transmission delay appear, that is, it is necessary to ensure that a duration from emergence to transmission of the service is shortened as much as possible. However, at present, a time-frequency resource is acquired based on scheduling at a base station or by contention, which cannot meet a transmission requirement of the low-delay services, and therefore flexibility of the D2D communication is seriously restricted, and reliability of the D2D communication is affected.

SUMMARY

The disclosure provides a method and apparatus for D2D communication, which can improve flexibility and reliability of the D2D communication.

At a first aspect, a method for D2D communication is provided, which may include that, first terminal device acquires a first time-frequency resource, the first time-frequency resource being a time-frequency resource for transmitting data of a first service and the first service being a D2D communication service; and the first terminal device transmits data of a second service with the first time-frequency resource, the second service being a D2D communication service.

In combination with the first aspect, in a first implementation mode of the first aspect, before the operation that the first terminal device transmits the data of the second service with the first time-frequency resource, the method may further include that, the first terminal device determines that a priority of the second service is higher than a priority of the first service; or the first terminal device determines that an urgency degree of the second service is higher than an urgency degree of the first service; or the first terminal device determines that a service type of the second service belongs to a preset first service type set, the first service type set may include at least one service type.

In combination with the first aspect and the abovementioned implementation mode thereof, in a second implementation mode of the first aspect, before the operation that the first terminal device transmits the data of the second service with the first time-frequency resource, the method may further include that, the first terminal device determines a size of a second time-frequency resource, the second time-frequency resource being a smallest time-frequency resource required by transmission of the data of the second service; and the first terminal device determines that a size of the first time-frequency resource is larger than or equal to the size of the second time-frequency resource.

In combination with the first aspect and the abovementioned implementation modes thereof, in a third implementation mode of the first aspect, before the operation that the first terminal device transmits the data of the second service with the first time-frequency resource, the method may further include that, the first terminal device determines that a transmission manner for the first service is semi-persistent transmission, the first time-frequency resource may specifically be a time-frequency resource corresponding to a next transmission cycle of the first service.

In combination with the first aspect and the abovementioned implementation modes thereof, in a fourth implementation mode of the first aspect, before the operation that the first terminal device transmits the data of the second service with the first time-frequency resource, the method may further include that, the first terminal device initiates first determination to determine that a first duration is less than or equal to a first preset threshold value, the first duration being a duration from a moment when the first determination is initiated to a starting moment of the first time-frequency resource in time domain.

In combination with the first aspect and the abovementioned implementation modes thereof, in a fifth implementation mode of the first aspect, before the operation that the first terminal device transmits the data of the second service with the first time-frequency resource, the method may further include that, the first terminal device initiates first determination to determine that a first duration is more than or equal to a second preset threshold value, the first duration being a duration from a moment when the first determination is initiated to a starting moment of the first time-frequency resource; the first terminal device initiates acquisition of a third time-frequency resource; and the first terminal device initiates second determination to determine that a second duration is more than or equal to a third preset threshold value, the second duration being a duration from a moment when the first terminal device initiates the acquisition of the third time-frequency resource to a moment when the first terminal device initiates the second determination and the third time-frequency resource being a time-frequency resource for transmitting the data of the second service.

In combination with the first aspect and the abovementioned implementation modes thereof, in a sixth implementation mode of the first aspect, when a transmission manner for the second service is semi-persistent transmission, before the operation that the first terminal device transmits the data of the second service with the first time-frequency resource, the method may further include that, the first terminal device determines that a transmission cycle of the second service is an integer multiple of a transmission cycle of the first service.

In combination with the first aspect and the abovementioned implementation modes thereof, in a seventh implementation mode of the first aspect, the first service may include at least two first services, and the first time-frequency resource may include at least two first time-frequency resources, the at least two first services may correspond to the at least two first time-frequency resources one to one, and each first time-frequency resource may be configured to transmit data of the corresponding first service: and, the first duration may include at least two first durations, the at least two first time-frequency resources may correspond to the at least two first durations one to one, and each first duration may be a duration from a present moment to a starting moment of the corresponding first time-frequency resource in the time domain. The operation that the first terminal device transmits the data of the second service with the first time-frequency resource, the first service being a D2D communication service, may include that, the first terminal device determines a target first service from the at least two first services, the first duration corresponding to the target first service may be a shortest duration of the at least two first durations; and the first terminal device transmits the data of the second service with the first time-frequency resource corresponding to the target first service.

In combination with the first aspect and the abovementioned implementation modes thereof, in an eighth implementation mode of the first aspect, the method may further include that, the first terminal device discards the data of the first service required to be transmitted with the first time-frequency resource.

In combination with the first aspect and the abovementioned implementation modes thereof, in a ninth implementation mode of the first aspect, the method may further include that, the first terminal device acquires a fourth time-frequency resource, time corresponding to the fourth time-frequency resource being outside a first semi-persistent transmission time range, the first semi-persistent transmission time range being a time range for transmission of the data of the first service and the first semi-persistent transmission time range including time corresponding to the first time-frequency resource; and the first terminal device transmits the data of the first service with the fourth time-frequency resource.

A second aspect provides an apparatus for D2D communication, which includes units configured to execute each step of any method for D2D communication in the first aspect and each implementation mode of the first aspect.

A third aspect provides an apparatus for D2D communication, which includes a memory and a processor, wherein the memory is configured to store a computer program, and the processor is configured to call, from the memory, and run the computer program to enable the apparatus for D2D communication to execute any method for D2D communication in the first aspect and each implementation mode thereof.

A fourth aspect provides a computer program product, which includes a computer program code, wherein the computer program code is run by a receiving unit, a processing unit, and a transmitting unit or run by a receiver, a processor, and a transmitter of terminal device to enable the terminal device to execute any method for D2D communication in the first aspect and each implementation mode thereof.

A fifth aspect provides a computer-readable storage medium, which stores a program, wherein the program enables terminal device to execute any method for D2D communication in the first aspect and each implementation mode thereof.

According to the method and apparatus for D2D communication of embodiments of the disclosure, the data of the second service is transmitted with the first time-frequency resource acquired by the first terminal device and intended for transmitting the data of the first service. Therefore, the terminal device does not have to initiate acquisition of a time-frequency resource for transmitting the second service in the case that, for example, the second service has a relatively high requirement on transmission delay. Accordingly, the transmission delay of the second service may be shortened, and flexibility and reliability of the D2D communication may further be improved.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skilled in the art according to these drawings without creative work.

FIG. 1 illustrates a schematic diagram of an example of a communication system, in which methods for D2D communication of the embodiments of the disclosure are applied.

FIG. 2 illustrates a schematic flowchart of an example of a method for D2D communication according to an embodiment of the disclosure.

DETAILED DESCRIPTION

Figure 3:
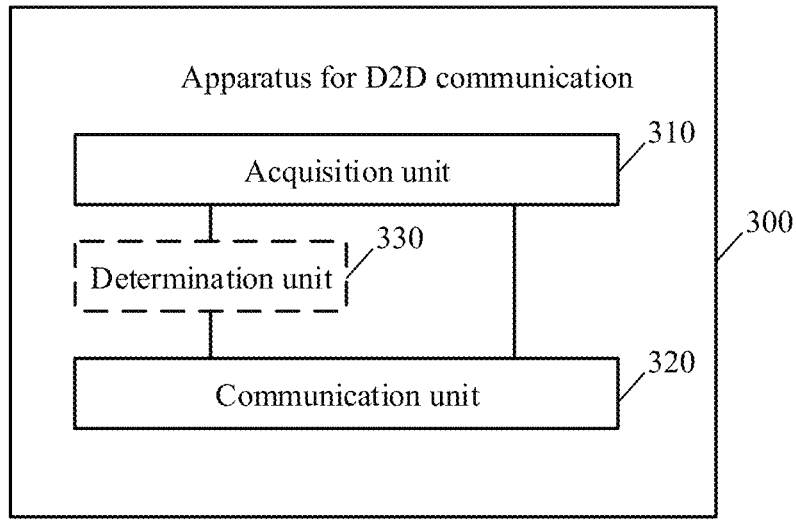
FIG. 3 illustrates a schematic block diagram of an example of an apparatus for D2D communication according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skilled in the art based on the embodiments in the disclosure without creative work shall fall within the scope of protection of the disclosure.

Terms "part", "module", "system" and the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings show that an application running on a computing device and the computing device may both be parts. One or more parts may reside in a process or an execution thread, and the parts may be located on a computer and/or distributed between two or more computers. In addition, these parts may be executed from various computer-readable media with various data structures stored thereon. The "parts" may communicate through local or remote processes according to, for example, signals with one or more data groups (for example, data from two parts interacting with another part of a local system, a distributed system or a network, for example, the Internet interacting with another system through signals).

Each aspect or characteristic of the disclosure may be implemented into a method, a device or a product programmed with a standard and/or using an engineering technology. Term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, a wireless channel and various other media capable of storing, including and/or bearing instructions and/or data.

The solutions of the embodiments of the disclosure may be applied to an existing cellular communication system, for example, systems of a Global System for Mobile Communication (GSM), Wideband Code Division Multiple Access (WCDMA) and Long Term Evolution (LTE), and supported communication mainly includes voice and data communication. The number of connections supported by a conventional base station are usually limited and the connections are easy to implement.

A next-generation mobile communication system will not only support conventional communication but also support Machine to Machine (M2M) communication, or called Machine Type Communication (MTC). It is predicted that, by 2020, the number of networked MTC devices will reach 500 to 1,000 hundred million, which will be far larger than an existing connection number. M2M services have greatly different network requirements due to diversity of their service types. There may roughly exist the following requirements: reliable transmission but insensitivity to delay; and low delay and high-reliability transmission.

It is easier to process a reliable transmission delay-insensitive service. However, a service of a low-delay and highly-reliable transmission type not only requires a short transmission delay but also requires reliability, for example, a V2V service or a Vehicle to Everything (V2X) service. Unreliable transmission may cause retransmission and an excessively long transmission delay and may not meet the requirements.

The solutions according to the embodiments of the disclosure may effectively solve the problem about transmission reliability.

Alternatively, a terminal device is a User Equipment (UE).

Each embodiment of the disclosure is described in combination with the terminal device. The terminal device may also be called a UE, a mobile station, an access terminal, a user unit, a user station, a mobile radio station, a remote station, a remote terminal, a mobile device, a user terminal, a terminal, a wireless communication device, a user agent, a user device or the like. The terminal device may be a station in a Wireless Local Area Network (WLAN), or may be a cell phone, a cordless phone, a Session Initiation Protocol (SIP) phone, a Wireless Local Loop (WLL) station, a Personal Digital Assistant (PDA), a handheld device with a wireless communication function, a computing device, other processing device(s) connected to a wireless modem, a vehicle-mounted device, a wearable device, a mobile station in a future 5th-Generation (5G) network, a terminal device in a future evolved Public Land Mobile Network (PLMN) or the like.

In addition, in the embodiments of the disclosure, the terminal device may further include other device(s), for example, a relay, capable of performing data communication with an access network device (for example, a base station).

Moreover, in the embodiments of the disclosure, access network device may be a device configured to communicate with the mobile station. The access network device may be a device, for example, a base station, configured to communicate with the mobile device, and the network device may be an Access Point (AP) in the WLAN, a Base Transceiver Station (BTS) in the GSM or Code Division Multiple Access (CDMA), or may be a NodeB (NB) in WCDMA, or may be an Evolutional Node B (eNB or eNodeB) in LTE, or a relay station or AP, or a vehicle-mounted device, a wearable device, an access network device in the future 5G network, an access network device in the future evolved PLMN or the like.

FIG. 1 illustrates a schematic diagram of a communication system 100 in which a method and apparatus for D2D communication of the embodiments of the disclosure are applied. As illustrated in FIG. 1, the communication system 100 includes at least two terminal devices, for example, a terminal device 110 and a terminal device 120 in FIG. 1. The terminal device 110 and the terminal device 120 may be, for example, cell phones, smart phones, portable computers, handheld communication devices, handheld computing devices, satellite radio devices, global positioning systems, PDAs and/or any other proper device(s) configured for communication in the wireless communication system 100.

At a given time, the terminal device 110 and the terminal device 120 may be a wireless communication transmitting device and/or a wireless communication receiving device. When there is data is to be transmitted, the wireless communication transmitting device may encode the data for transmission. Specifically, the wireless communication transmitting device may acquire (for example, generation, receiving from another communication device or storage in a memory) a certain number of data bits to be transmitted to the wireless communication receiving device through a channel. The data bits may be included in a transmission block (or multiple transmission blocks) of the data, and the transmission block may be segmented to generate multiple code blocks.

It is to be understood that the number of the terminal devices, listed above, included in the communication system 100 is only exemplarily described and not intended to limit the disclosure. The number of the terminal devices included in the communication system 100 may be any integer more than 1.

In addition, the communication system 100 may be a PLMN or a D2D network or an M2M network or a V2V network or a V2X network or another network. FIG. 1 is only a simplified schematic diagram listed as an example, and the network may further include other network device(s) which is not drawn in FIG. 1. For example, the communication system 100 may further include an access network device (not illustrated in FIG. 1).

The access network device may include multiple antennae. In addition, the access network device may include a transmitter chain and a receiver chain. Those of ordinary skilled in the art may understand that each of them may include multiple parts (for example, a processor, a modulator, a multiplexer, a demodulator, a demultiplexer or an antenna) related to signal transmitting and receiving.

The access network device may communicate with multiple pieces of terminal device (for example, the terminal device 110 and the terminal device 120). However, it can be understood that the access network device may communicate with any number of terminal devices like the terminal device 110 or 120.

In addition, the access network device may be configured with multiple antennae, and moreover, for example, the access network device may, via an antenna, transmit information to the terminal device 110 based on a forward link and receive information from the terminal device 110 through a reverse link. Moreover, the access network device may further, via another antenna, transmit information to the terminal device 120 based on the forward link and receive information from the terminal device 120 through the reverse link.

For example, in a Frequency Division Duplex (FDD) system, the forward link and reverse link used by the same terminal device may be within different frequency bands.

For another example, in a Time Division Duplex (TDD) system and a full duplex system, the forward link and reverse link used by the same terminal device may be within a common frequency band.

Each antenna (or an antenna group formed by multiple antennae) and/or region, designed for communication, of the access network device are/is called sectors/a sector of the access network device. For example, the antenna group may be designed to communicate with terminal device in a sector of coverage area of the access network device. In a process that the access network device communicates with the terminal device through the forward links 1 respectively, a transmitting antenna of the access network device may use beamforming to improve a signal noise ratio of the forward link. In addition, compared with a manner that the access network device transmits signals to all its terminal devices through a single antenna, when the access network device transmits signals to the terminal devices randomly scattered in the related coverage area by virtue of beamforming, mobile device in an adjacent cell may be interfered less.

At a given time, the access network device may be a wireless communication transmitting device and/or a wireless communication receiving device. When there is data to be transmitted, the wireless communication transmitting device may encode the data for transmission. Specifically, the wireless communication transmitting device may acquire (for example, generation, receiving from another communication device or storage in a memory) a certain number of data bits to be transmitted to the wireless communication receiving device through a channel. The data bits may be included in a transmission block (or multiple transmission blocks) of the data, and the transmission block may be segmented to generate multiple code blocks.

Frequency-domain resources used for D2D communication in the embodiments of the disclosure will be described below.

Alternatively, in the embodiments of the disclosure, the terminal device may use unlicensed spectrum resources (or, unlicensed frequency bands) for D2D communication, that is, the communication system 100 of the embodiments of the disclosure is a communication system capable of using the unlicensed frequency bands. Exemplarily but unlimitedly, the communication system 100 may adopt a licensed-Assisted Access Using LTE (LAA-LTE) technology, or, may adopt a technology supporting independent deployment of the communication system in the unlicensed frequency bands, for example, Standalone LTE over unlicensed spectrum, or, may further adopt an LTE Advanced in Unlicensed Spectrums (LTE-U) technology. For example, the communication system 100 may independently deploy an LTE system in the unlicensed frequency bands and further complete communication by adopting an LTE air interface protocol on the unlicensed frequency bands, and the system includes no licensed frequency band. The LTE system deployed in the unlicensed frequency bands may use a technology of centralized scheduling, interference coordination, Hybrid Automatic Repeat Request (HARQ) and the like, and compared with an access technology of Wireless Fidelity (Wi-Fi), the technology has higher robustness and may achieve higher spectral efficiency and provide wider coverage and a better user experience.

An unlicensed spectrum resource may be a resource, which may be shared by each communication devices without allocation of the system, in the unlicensed spectrum. Resource sharing on the unlicensed frequency bands means only specifying limits to indexes such as transmitted power and out-of-band leakage in terms of use of a specific spectrum to ensure that a basic coexistence requirement of multiple devices sharing the frequency band is met. An operating company may achieve a purpose of network capacity offloading by use of unlicensed frequency band resources, but is required to comply with regulatory requirements of different regions and different spectrums on the unlicensed frequency band resources. These requirements are usually made to protect public systems such as a radar and ensure no detrimental impact and fair coexistence between multiple systems as much as possible, and include transmitted power limits, out-of-band leakage index and indoor and outdoor use limits, some additional coexistence strategies in some regions, and the like. For example, each communication device may use spectrum resources in a contention manner or an interception manner, for example, a manner specified by Listen Before Talk (LBT).

Exemplarily but unlimitedly, in the embodiments of the disclosure, the unlicensed spectrum resources may include an approximately 900 MHz frequency band nearby 5 GHz and an approximately 90 MHz frequency band nearby a 2.4 GHz frequency band.

In addition, in the embodiments of the disclosure, the terminal device may further use licensed spectrum resources for D2D communication, that is, the communication system 100 of the embodiments of the disclosure is a communication system capable of using licensed frequency bands.

A licensed spectrum resource is usually a spectrum resource which may be used only after being examined and approved by the national or local wireless communication commissions. Different systems, for example, an LTE system and a Wi-Fi system, or, systems of different operating systems may not share licensed spectrum resources.

FIG. 2 illustrates a schematic flowchart of a method for D2D communication according to an embodiment of the disclosure. As illustrated in FIG. 2, the method 200 includes the following operations.

In S210, a first terminal device acquires a first time-frequency resource. The first time-frequency resource is a time-frequency resource for transmitting data of a first service, and the first service is a D2D communication service.

In S220, the first terminal device transmits data of a second service with the first time-frequency resource, the second service being a D2D communication service.

Specifically, in S210, a terminal device A (i.e., an example of the first terminal device) may generate a service A (i.e., an example of the first service) and, moreover, the terminal device A may acquire a time-frequency resource A (i.e., an example of the first time-frequency resource) for transmitting data of the service A at a moment A.

Exemplarily but unlimitedly, for example, in the embodiment of the disclosure, the terminal device A may acquire the time-frequency resource A based on scheduling of an access network device (for example, a base station). In addition, in this case, the time-frequency resource A may be determined by the access network device from a used licensed spectrum resource or unlicensed spectrum resource, which is not specially limited in the disclosure. Moreover, a specific process and method by which the terminal device A acquires the time-frequency resource A based on scheduling of the access network device may be similar to the existing process and method by which a terminal device acquires a time-frequency resource for D2D communication based on scheduling of an access network device, and detailed descriptions thereof will be omitted herein to avoid elaborations.

Or, in the embodiment of the disclosure, the terminal device A may autonomously determine the time-frequency resource A. For example, the terminal device A may determine the time-frequency resource A, for example, in a contention manner or in an interception manner. In addition, in this case, the time-frequency resource A may belong to a licensed spectrum resource or an unlicensed spectrum resource provided by a communication system for multiple terminal devices to use in the contention manner and the like, which is not specially limited in the disclosure. Moreover, a specific process and method by which the terminal device A autonomously determines the time-frequency resource A may be similar to an existing process and method by which the terminal device autonomously determines a time-frequency resource for D2D communication, and detailed descriptions thereof will be omitted herein to avoid elaborations.

In S220, when the terminal device A generates a service B (i.e., an example of the second service) at a moment B (after the moment A), the terminal device A may transmit data of the service B with the time-frequency resource A.

In such a manner, the terminal device A does not have to execute a process of acquiring a time-frequency resource B (i.e., an example of a second time-frequency resource) for transmitting the data of the service B, so that a transmission delay of the service B may be shortened.

Exemplarily but unlimitedly, in the embodiment of the disclosure, one or more preset conditions may be preset, and the terminal device A may determine whether the preset condition is met according to one or more parameters related to such as the service B, the service A and the time-frequency resource A. After determining that the preset condition is met, the terminal device A may transmit the data of the service B with the time-frequency resource A.

Exemplarily but unlimitedly, in the embodiment of the disclosure, at least one of the following conditions may be listed as the preset condition.

Condition A

Alternatively, before the operation that the first terminal device transmits the data of the second service with the first time-frequency resource, the method further includes one of the following operations.

The first terminal device determines that a priority of the second service is higher than a priority of the first service.

Or, the first terminal device determines that an urgency degree of the second service is higher than an urgency degree of the first service.

Or, the first terminal device determines that a service type of the second service belongs to a preset first service type set, which includes at least one service type.

Specifically, before the terminal device A transmits the data of the service B with the time-frequency resource A, the terminal device A may further determine whether transmission of the service B is prior to transmission of the service A.

Exemplarily but unlimitedly, for example, the terminal device A may determine whether transmission of the service B is prior to transmission of the service A according to priorities of the service B and the service A. For example, in the embodiment of the disclosure, the terminal device A may acquire information (recorded hereinafter as priority information for convenience of understanding and description) indicating a priority of each service, and exemplarily but unlimitedly, the terminal device A may acquire the priority information from the network device (for example, the network access device such as the base station). Or, the priority information may be configured in the terminal device A by a manufacturer when the terminal device A is delivered. Or, the priority information may be input into the terminal device A by a user. Therefore, the terminal device A may determine the priorities of the service B and the service A according to the priority information. If the priority of the service B is higher than the priority of the service A, the terminal device A may determine that transmission of the service B is prior to transmission of the service A and the terminal device A may further transmit the data of the service B with the time-frequency resource A. Moreover, exemplarily but unlimitedly, in the embodiment of the disclosure, the priority information may indicate a first mapping relationship between various of service type sets and various priorities. Each of service type set includes at least one service type. Therefore, the terminal device A may determine a service type set to which the service A belongs according to a service type of the service A and further determine the priority of the service A. Similarly, the terminal device A may determine a service type set to which the service B belongs according to a service type of the service B and further determine the priority of the service B. Or, in the embodiment of the disclosure, the priority information may indicate a first mapping relationship between various service identifier sets and various priorities, each service identifier set includes at least one service identifier. Therefore, the terminal device A may determine a service identifier set to which the service A belongs according to a service identifier of the service A and further determine the priority of the service A. Similarly, the terminal device A may determine a service identifier set to which the service B belongs according to a service identifier of the service B and further determine the priority of the service B. In addition, exemplarily but unlimitedly, according to a sequence from high to low priorities, the priorities in the embodiment of the disclosure may sequentially be a high priority, a normal priority and a low priority.

For another example, the terminal device A may determine whether transmission of the service B is prior to transmission of the service A according to urgency degrees of the service B and the service A. For example, in the embodiment of the disclosure, the terminal device A may acquire information (recorded hereinafter as urgency degree information for convenience of understanding and description) indicating an urgency degree of each service. Exemplarily but unlimitedly, the terminal device A may acquire the urgency degree information from the network device (for example, the network access device such as the base station). Or, the urgency degree information may be configured in the terminal device A by the manufacturer when the terminal device A is delivered. Or, the urgency degree information may be input into the terminal device A by the user. Therefore, the terminal device A may determine the urgency degrees of the service B and the service A according to the urgency degree information. If the urgency degree of the service B is higher than the urgency degree of the service A, the terminal device A may determine that transmission of the service B is prior to transmission of the service A and the terminal device A may further transmit the data of the service B with the time-frequency resource A. Moreover, exemplarily but unlimitedly, in the embodiment of the disclosure, the urgency degree information may indicate a first mapping relationship between various service type sets and various urgency degrees, each service type set includes at least one service type. Therefore, the terminal device A may determine the service type set to which the service A belongs according to the service type of the service A and further determine the urgency degree of the service A. Similarly, the terminal device A may determine the service type set to which the service B belongs according to the service type of the service B and further determine the urgency degree of the service B. Or, in the embodiment of the disclosure, the urgency degree information may indicate a first mapping relationship between various service identifier sets and various urgency degrees, each service identifier set includes at least one service identifier. Therefore, the terminal device A may determine the service identifier set to which the service A belongs according to the service identifier of the service A and further determine the urgency degree of the service A. Similarly, the terminal device A may determine the service identifier set to which the service B belongs according to the service identifier of the service B and further determine the urgency degree of the service B. In addition, exemplarily but unlimitedly, according to a sequence from high to low urgency degrees, the urgency degrees in the embodiment of the disclosure may sequentially be urgent and non-urgent.

For another example, the terminal device A may determine whether transmission of the service B is prior to transmission of the service A according to the service type of the service B. For example, in the embodiment of the disclosure, the terminal device A may acquire information (recorded hereinafter as service type information for convenience of understanding and description) indicating a service type of services which may be transmitted preferentially. Exemplarily but unlimitedly, the terminal device A may acquire the service type information from the network device (for example, the network access device such as the base station). Or, the service type information may be configured in the terminal device A by the manufacturer when the terminal device A is delivered. Or, the service type information may be input into the terminal device A by the user. Therefore, the terminal device A may determine the service type(s) (i.e., an example of the first service type set) of the (one or more) services which may be transmitted preferentially according to the service type information. If the service type of the service B belongs to the service type(s) of the services which may be transmitted preferentially, the terminal device A may determine that transmission of the service B is prior to transmission of the service A and the terminal device A may further transmit the data of the service B with the time-frequency resource A.

Condition B

Alternatively, before the operation that the first terminal device transmits the data of the second service with the first time-frequency resource, the method further includes the following operations.

The first terminal device determines a size of a second time-frequency resource, the second time-frequency resource being a smallest time-frequency resource required by transmission of the data of the second service.

The first terminal device determines that a size of the first time-frequency resource is larger than or equal to the size of the second time-frequency resource.

Specifically, in the embodiment of the disclosure, the terminal device A may determine a size of a smallest time-frequency resource (for example, the time-frequency resource B) required by transmission of the data of the service B. If a size of the time-frequency resource A is larger than or equal to a size of the time-frequency resource B, or, if the size of the time-frequency resource A may meet a lowest transmission requirement of the data of the service B, the terminal device A may transmit the data of the service B with the time-frequency resource A.

Exemplarily but unlimitedly, in the embodiment of the disclosure, the terminal device A may determine a highest Modulation and Coding Scheme (MCS) allowed by the service B according to a Quality of Service (QoS) requirement of the service B and further determine the smallest time-frequency resource required by transmission of the data of the service B.

Condition C

Alternatively, before the operation that the first terminal device transmits the data of the second service with the first time-frequency resource, the method further includes the following operations.

The first terminal device determines that a transmission manner for the first service is semi-persistent transmission. The first time-frequency resource is specifically a time-frequency resource intended for a next transmission cycle of the first service.

Specifically, along with development of the communication technologies, with respect to determining a time-frequency resource based on scheduling, various scheduling manners for a D2D communication service may be provided, for example, dynamic scheduling, static scheduling and semi-persistent scheduling.

Semi-persistent scheduling (i.e., an example of semi-persistent transmission) may also be called semi-persistent scheduling. That is, the access network device may allocate a certain communication duration range (or, an effective time range of semi-persistent transmission) to the terminal device and the terminal device may use a frequency-domain resource allocated by the access network device according to a certain cycle (which may also be called a duty cycle) within the effective time range of semi-persistent transmission. In this way, the access network device may notify the terminal device of the frequency-domain resource used within the effective time range of semi-persistent transmission by one resource scheduling and does not have to indicate the frequency-domain resource through scheduling signaling again within the effective time range of semi-persistent transmission. Compared with dynamic scheduling, such a scheduling manner is slightly poor in flexibility but relatively low in control signaling overhead and suitable for a service with a non-obvious burst characteristic and a rate ensuring requirement, for example, a Voice over Internet Protocol (VoIP) service or a Voice over Long Term Evolution (VoLTE) service.

Similarly, in the case that the time-frequency resource is determined in the contention manner, the interception manner or the like, the terminal device may contend for a certain communication duration range (or an effective time range of semi-persistent transmission, for example, a duration range corresponding to a burst transmission, or, a duration range corresponding to a transmission opportunity), and the terminal device may use a frequency-domain resource obtained by contention according to a certain cycle within the effective time range of semi-persistent range, so that the terminal device may acquire a frequency-domain resource to be used within the effective time range of semi-persistent transmission by one contention and does have to contend for or intercept the frequency-domain resource again within the effective time range of semi-persistent transmission.

Assume that the terminal device A determines, at moment C (i.e., an example of a current moment, exemplarily but unlimitedly, the moment C and the moment B may be the same moment), whether to use the time-frequency resource for the service A to transmit the data of the service B. In this case, the time-frequency resource A may be a time-frequency resource corresponding to a first transmission cycle of the service A after the moment C (i.e., a next transmission cycle (for example, a next duty cycle) of the service A, or, a next transmission time period of the service A).

Exemplarily but unlimitedly, assume that two adjacent transmission cycles (or transmission time periods) of the service A are cycle A and cycle B, and if the moment C is between the cycle A and the cycle B (specifically, a time period after a starting moment of the cycle A and before a starting moment of the cycle B), the "next transmission cycle of the service A" may be the cycle B.

Therefore, if the transmission manner for the service A is semi-persistent transmission, the terminal device A may determine that there may be multiple transmission cycles for the data of the service A, that is, there may be multiple other time ranges for transmission of the service A besides a time range corresponding to the time-frequency resource A. Therefore, the terminal device A may determine that occupation of the time-frequency resource A for another service may have relatively small influences on transmission, user experiences may further be improved, and transmission reliability may be improved.

Condition D

Alternatively, before the operation that the first terminal device transmits the data of the second service with the first time-frequency resource, the method further includes that, the first terminal device initiates first determination to determine that a first duration is less than or equal to a first preset threshold value, the first duration being a duration from a moment when the first determination is initiated to a starting moment of the first time-frequency resource in time domain.

Specifically, the terminal device A may perform processing (i.e., an example of the first determination) of determining whether to use the time-frequency resource for the service A to transmit the data of the service B. Moreover, the terminal device A may record a starting moment of the first determination (for example, the moment C, exemplarily but unlimitedly, the moment C and the moment B may be the same moment).

Assume that a duration between the moment C and a starting moment of the time-frequency resource A is a duration A (i.e., an example of the first duration), and based on the condition C, the terminal device A may further determine whether the duration A is less than or equal to a preset time threshold value #1 (i.e., an example of the first threshold value). In the case that a determination result is "YES", the terminal device A may determine to use the time-frequency resource A to transmit the data of the service B.

Exemplarily but unlimitedly, the time threshold value #1 may be a duration from initiation of acquisition of the time-frequency resource (for example, the time-frequency resource B) to determination of the time-frequency resource, executed by the terminal device A. For example, the time threshold value #1 may be a duration from initiation of a resource scheduling request to the base station to reception and parsing of the time-frequency resource allocated by the base station, executed by the terminal device A. Or, the time threshold value #1 may be a duration from initiation of contention or interception to determination of the time-frequency resource, executed by the terminal device A.

In addition, in the embodiment of the disclosure, the time threshold value #1 may be obtained according to an experiment and preset in the terminal device A by the manufacturer when the terminal device A is delivered, or, the time threshold value #1 may be input into the terminal device A by the user. There are no special limits made in the disclosure.

In addition, exemplarily but unlimitedly, the time threshold value #1 may be a specific duration or may be a duration range including various durations, which is not specially limited in the disclosure. Moreover, exemplarily but unlimitedly, the time threshold value #1 may be, for example, 10 milliseconds (ms).

Accordingly, if the duration A is less than or equal to the preset time threshold value #1, it indicates that a delay of transmission of the data of the service B with the time-frequency resource A is shorter than a delay of transmission of the data of the service B with the time-frequency resource B. Therefore, an effect of the disclosure may further be improved.

Condition E

Alternatively, before the operation that the first terminal device transmits the data of the second service with the first time-frequency resource, the method further includes the following actions.

The first terminal device initiates first determination to determine that a first duration is more than or equal to a second preset threshold value, the first duration being a duration from a moment when the first determination is initiated to a starting moment of the first time-frequency resource.

The first terminal device initiates acquisition of a third time-frequency resource.

The first terminal device initiates second determination to determine that a second duration is more than or equal to a third preset threshold value, the second duration being a duration experienced from a moment when the first terminal device initiates the acquisition of the third time-frequency resource to a moment when the second determination is initiated and the third time-frequency resource being a time-frequency resource for transmitting the data of the second service.

Specifically, the terminal device A may perform processing (i.e., an example of the first determination) of determining whether to use the time-frequency resource for the service A to transmit the data of the service B. Moreover, the terminal device A may record a starting moment of the first determination (for example, the moment C, exemplarily but unlimitedly, the moment C and the moment B may be the same moment).

Assume that a duration between the moment C and a starting moment of the time-frequency A is a duration A (i.e., an example of the first duration), and based on condition C, the terminal device A may further determine whether the duration A is less than or equal to a preset time threshold value #2 (i.e., an example of the first threshold value).

Exemplarily but unlimitedly, the time threshold value #2 may be a duration from initiation of acquisition of the time-frequency resource (for example, the time-frequency resource B) to determination of the time-frequency resource, executed by the terminal device A. For example, the time threshold value #2 may be a duration from initiation of a resource scheduling request to the base station to reception and parsing of the time-frequency resource allocated by the base station, executed by the terminal device A. Or, the time threshold value #2 may be a duration from initiation of contention or interception to determination of the time-frequency resource, executed by the terminal device A.

In addition, in the embodiment of the disclosure, the time threshold value #2 may be obtained according to an experiment and preset in the terminal device A by the manufacturer when the terminal device A is delivered, or, the time threshold value #2 may be input into the terminal device A by the user. There are no special limits made in the disclosure.

In addition, exemplarily but unlimitedly, the time threshold value #2 may be a specific duration, or may be a duration range including various durations, which is not specially limited in the disclosure. Moreover, exemplarily but unlimitedly, the time threshold value #2 may be, for example, 10 ms.

It is to be noted that, in the embodiment of the disclosure, the time threshold value #2 may be the same as the time threshold value #1 or the time threshold value #2 may be greater than the time threshold value #1, which is not specially limited in the disclosure.

In such a manner, when the duration A is more than or equal to the preset time threshold value #2, a result of the first determination indicates that a delay of transmission of the data of the service B with the time-frequency resource A may be longer than a delay of an acquisition of a new resource for transmitting the data of the service B, so that the terminal device A may initiate acquisition of the time-frequency resource B. Moreover, the terminal device A may record a moment (recorded as a moment D) when the acquisition of the time-frequency resource B is initiated.

The terminal device A may determine whether to use the time-frequency resource for the service A to transmit the data of the service B again before the starting moment of the time-frequency resource A (i.e., an example of the second determination). The terminal device A may determine a duration B (i.e., an example of the second duration) from the moment D to a starting moment of the second determination.

The terminal device A may further determine whether the duration B is more than or equal to a preset time threshold value #3 (i.e., an example of the third threshold value). Under the condition that a determination result is "YES", the terminal device A may determine to use the time-frequency resource A to transmit the data of the service B.

Exemplarily but unlimitedly, the time threshold value #3 may be a duration from initiation of the acquisition of the time-frequency resource (for example, the time-frequency resource B) to determination of the time-frequency resource, executed by the terminal device A. For example, the time threshold value #3 may be a duration from initiation of the resource scheduling request to the base station to reception and parsing of the time-frequency resource allocated by the base station, executed by the terminal device A. Or, the time threshold value #3 may be a duration from initiation of contention or monitoring to determination of the time-frequency resource, executed by the terminal device A.

Accordingly, if the duration B is more than or equal to the preset time threshold value #3, it indicates that the terminal device A may not acquire the time-frequency resource B. Therefore, the delay of transmission of the data of the service B with the time-frequency resource A may still be shorter than the delay of transmission of the data of the service B with the time-frequency resource B. Therefore, the effect of the disclosure may further be improved.

It is to be noted that, in the embodiment of the disclosure, the time threshold value #3 may be smaller than the time threshold value #2, so that it may be ensured that a moment when the terminal device A determines to use the time-frequency resource A to transmit the data of the service B is prior to the starting moment of the time-frequency resource A. Therefore, reliability of transmitting the data of the service B with the time-frequency resource A may further be ensured.

Condition F

When a transmission manner for the second service is semi-persistent transmission, before the operation that the first terminal device transmits the data of the second service with the first time-frequency resource, the method further includes that, the first terminal device determines that a transmission cycle of the second service is an integer multiple of a transmission cycle of the first service.

Specifically, in the embodiment of the disclosure, if the transmission manner for the service A is semi-persistent transmission and, a transmission manner for the service B is semi-persistent transmission, the terminal device A may determine whether a transmission cycle of the service B is an integer multiple of the transmission cycle of the service A. In the case that a determination result is "YES", the terminal device A may determine to use the time-frequency resource A to transmit the data of the service B. Exemplarily but unlimitedly, for example, if the transmission cycle of the service A is Xms, X>0, when the transmission cycle of the service B is K·Xms, the terminal device A may determine to use the time-frequency resource A to transmit the data of the service B, where K is an integer greater than 0.

Therefore, it can be ensured that the data of the service B is completely transmitted with the time-frequency resource intended for the service A. Exemplarily but unlimitedly, for example, if the cycle of the service A (or, a time interval between two adjacent transmission time periods of the service A) is 10 ms and the cycle of the service B (or, a time interval between two adjacent transmission time periods of the service B) is 20 ms, in the case that a total transmission duration range of the service A includes a total transmission duration range of the service B, the data on each transmission time period of the service B may be transmitted with the time-frequency resource intended for the service A. For another example, if the cycle of the service B (or, the time interval between the two adjacent transmission time periods of the service B) is 5 ms and the cycle of the service A (or, the time interval between the two adjacent transmission time periods of the service A) is 10 ms, the data on some of transmission time periods of the service B may not be transmitted with the time-frequency resource intended for the service A. For example, assume that starting moments of first cycles of the service A and the service B are overlapped, and then the data on transmission time periods, with an even number, of the service B may not be transmitted with the time-frequency resource intended for the service A.

It is to be understood that each determination condition listed above is only exemplarily described and not intended to limit the disclosure. Moreover, each of the abovementioned conditions may be independently used and may also be combined for use, which is not specially limited in the disclosure.

In the embodiment of the disclosure, multiple first services may coexist, that is, another service for which a resource has been obtained before the moment B may exist, besides the service A. For convenience of understanding and description, the first service other than the service A will be described below with a service C as an example. That is, the terminal device A has acquired a time-frequency resource (i.e., another example of the first time-frequency resource, recorded hereinafter as a time-frequency resource C for convenience of understanding and distinction) for transmitting data of the service C before the moment B.

Moreover, alternatively, the terminal device A may also determine whether the service C meets one or more of the conditions A to E.

Therefore, when the terminal device A determines that both the time-frequency resource A and the time-frequency resource C may be configured to transmit the data of the service B, the terminal device A may also select one time-frequency resource (i.e., an example of a first time-frequency resource corresponding to a target first service) from the time-frequency resource A and the time-frequency resource C to transmit the data of the service B.

Exemplarily but unlimitedly, the terminal device A may determine the target first service and the first time-frequency resource for the target first service according to starting moments of first time-frequency resources (for example, the time-frequency resource A and the time-frequency resource C) corresponding to each first service (for example, the service A and the service C). For example, the terminal device A may record a moment (recorded as a moment F) for selection, then, as described above, the starting moment of each first time-frequency resource is after the moment F. Moreover, the terminal device A may determine the first service corresponding to the first time-frequency resource of which the starting moment is closest to the moment F to be the target first service.

For example, assume that first services (meeting one or more conditions in the conditions A to E) include the service A and the service C. If the starting moment of the time-frequency resource A is before the starting moment of the time-frequency resource C (both the starting moment of the time-frequency resource C and the starting moment of the time-frequency resource A are after the moment F), the terminal device A may determine the service A to be the target first service, that is, the terminal device A may determine to use the time-frequency resource A to transmit the data of the service B.

After the terminal device A transmits the data of the service B with the time-frequency resource A, the terminal device A may also perform further processing on the data (recorded hereinafter as data A for convenience of understanding and distinction) of the service A which was intended to be transmitted with the time-frequency resource A.

For example, alternatively, a communication unit may further be configured to discard the data of the first service to be transmitted with the first time-frequency resource.

Specifically, the terminal device A may discard the data A.

Or, alternatively, an acquisition unit may further be configured to acquire a fourth time-frequency resource. Time corresponding to the fourth time-frequency resource is outside a first semi-persistent transmission time range, the first semi-persistent transmission time range is a time range for transmission of the data of the first service and the first semi-persistent transmission time range includes time corresponding to the first time-frequency resource.

The communication unit may further be configured to transmit the data of the first service with the fourth time-frequency resource.

Specifically, in the embodiment of the disclosure, since the time-frequency resource A is used to transmit the data of the service B, the data A is not transmitted. Under this condition, the terminal device A may transmit the data A with a one-cycle delay, and the data of the service A, which is after the data A in a transmission sequence, may be sequentially delayed for a cycle.

Under this condition, if the size of the time-frequency resource acquired by the terminal device A and configured to transmit the data of the service A can merely meet a data size of the service A, transmitting the data of the service B with the time-frequency resource A may make the acquired time-frequency resource intended for transmit the data of the service A insufficient for transmission of the data of the service A and further cause no time-frequency resource capable of carrying data (recorded hereinafter as data B for convenience of understanding and distinction), at the end in the transmission sequence, of the service A.

Then, the terminal device A may, for example, initiate a process of acquiring a time-frequency resource for transmitting the data B within the effective time range for semi-persistent transmission of the service A. Moreover, if the time-frequency resource for transmitting the data B can be acquired within the effective time range for semi-persistent transmission of the service A, the terminal device A may transmit the data B with the acquired time-frequency resource. If the time-frequency resource for transmitting the data B cannot be acquired within the effective time range for semi-persistent transmission of the service A, the terminal device A may discard the data B.

It is to be understood that a processing manner, listed above, for the data A and the data B is only exemplarily described and not intended to limit the disclosure. For example, the terminal device A may normally transmit data (for example, the data B) of the service A other than the data A. In addition, the terminal device A may, for example, initiate a process of acquiring a time-frequency resource for the data A within the effective time range for semi-persistent transmission of the service A. If the time-frequency resource for transmitting the data A can be acquired within the effective time range for semi-persistent transmission of the service A, the terminal device A may transmit the data A with the acquired time-frequency resource. If the time-frequency resource for transmitting the data A cannot be acquired within the effective time range for semi-persistent transmission of the service A, the terminal device A may discard the data A.

It is to be noted that, in the embodiment of the disclosure, the terminal device to which the service A is to be transmitted and a terminal device to which the service B is to be transmitted may be the same or may be different, which is not specially limited in the disclosure.

Moreover, in the embodiment of the disclosure, the terminal device A (i.e., an example of the first terminal device) may transmit the data of the service A (i.e., an example of the first service) and the data of the service B (i.e., an example of the second service) in a broadcasting manner.

The broadcasting manner may ensure that the terminal device to which the service B is to be transmitted may detect the time-frequency resource A and further acquire the data of the service B from the time-frequency resource A.

According to the method for D2D communication of the embodiment of the disclosure, the data of the second service is transmitted with the first time-frequency resource which was acquired by the first terminal device in the time domain and was intended for transmitting the data of the first service, so that the terminal device does not have to initiate acquisition of the time-frequency resource for transmitting the second service under the condition that, for example, the second service has a relatively high requirement on a transmission delay, the transmission delay of the second service may be shortened, and flexibility and reliability of the D2D communication may further be improved.

The method for D2D communication according to the embodiments of the disclosure is described above in combination with FIG. 1 to FIG. 2 in detail, and an apparatus for D2D communication according to the embodiments of the disclosure will be described below in combination with FIG. 3 in detail.

FIG. 3 illustrates a schematic block diagram of an apparatus for D2D communication 300 according to an embodiment of the disclosure. As illustrated in FIG. 3, the apparatus 300 includes an acquisition unit 310 and a communication unit 320.

The acquisition unit 310 may be configured to acquire a first time-frequency resource, the first time-frequency resource being a time-frequency resource for transmitting data of a first service and the first service being a D2D communication service.

The communication unit 320 may be configured to transmit data of a second service with the first time-frequency resource, the second service being a D2D communication service.

Alternatively, the apparatus 300 may further include a determination unit 330, configured to determine that a priority of the second service is higher than a priority of the first service, or determine that an urgency degree of the second service is higher than an urgency degree of the first service, or determine that a service type of the second service belongs to a preset first service type set, where the first service type set includes at least one service type.

Alternatively, the apparatus 300 may further include a determination unit 330, configured to determine a size of a second time-frequency resource, the second time-frequency resource being a smallest time-frequency resource required by transmission of the data of the second service and determine that a size of the first time-frequency resource is larger than or equal to the size of the second time-frequency resource.

Alternatively, the apparatus 300 may further include a determination unit 330, configured to determine that a transmission manner for the first service is semi-persistent transmission. The first time-frequency resource is specifically a time-frequency resource intended for a next transmission cycle of the first service.

Alternatively, the determination unit 330 may further be configured to initiate first determination to determine that a first duration is less than or equal to a first preset threshold value. The first duration is a duration from a moment when the first determination is initiated to a starting moment of the first time-frequency resource in time domain.

Alternatively, the determination unit 330 may further be configured to initiate first determination to determine that a first duration is more than or equal to a second preset threshold value. The first duration is a duration from a moment when the first determination is initiated to a starting moment of the first time-frequency resource in time domain.

The determination unit 330 may further be configured to initiate acquisition of a third time-frequency resource.

The determination unit 330 may further be configured to initiate second determination to determine that a second duration is more than or equal to a third preset threshold value. The second duration is a duration experienced from a moment when first terminal device initiates the acquisition of the third time-frequency resource to a moment when first terminal device initiates the second determination, and the third time-frequency resource is a time-frequency resource for transmitting the data of the second service.

Alternatively, when a transmission manner for the second service is semi-persistent transmission, the determination unit 330 may further be configured to determine that a transmission cycle of the second service is an integer multiple of a transmission cycle of the first service.

Alternatively, the first service may include at least two first services, and the first time-frequency resource may include at least two first time-frequency resources, the at least two first services may correspond to the at least two first time-frequency resources one to one, and each first time-frequency resource may be configured to transmit data of the corresponding first service. The first duration may include at least two first durations, the at least two first time-frequency resources may correspond to the at least two first durations one to one, and each first duration may be a duration from a present moment to a starting moment of the corresponding first time-frequency resource in the time domain.

The determination unit 330 may further be configured to determine a target first service from the at least two first services. The first duration corresponding to the target first service is a shortest duration of the at least two first durations.

The communication unit 320 may be configured to transmit the data of the second service with the first time-frequency resource intended for the target first service.

Alternatively, the communication unit 320 may further be configured to discard the data of the first service to be transmitted with the first time-frequency resource.

Alternatively, the acquisition unit 310 may further be configured to acquire a fourth time-frequency resource. Time corresponding to the fourth time-frequency resource is outside a first semi-persistent transmission time range, the first semi-persistent transmission time range is a time range for transmission of the data of the first service, and the first semi-persistent transmission time range includes time corresponding to the first time-frequency resource.

The communication unit 320 may further be configured to transmit the data of the first service with the fourth time-frequency resource.

The apparatus for D2D communication 300 according to the embodiment of the disclosure may correspond to first terminal device (for example, terminal device A) in the method of the embodiment of the disclosure. Moreover, each unit, i.e., module, in the apparatus 300 for D2D communication and the other abovementioned operations and/or functions are intended to implement the corresponding flows in the method 200 in FIG. 2 and will not be elaborated herein for simplicity. Moreover, the apparatus 300 may be embedded into or may be a terminal device.

According to the apparatus for D2D communication of the embodiment of the disclosure, the data of the second service is transmitted with the first time-frequency resource which was acquired by the first terminal device in the time domain and was intended for transmitting the data of the first service, so that the terminal device does not have to initiate acquisition of the time-frequency resource for transmitting the second service under the condition that, for example, the second service has a relatively high requirement on a transmission delay, the transmission delay of the second service may be shortened, and flexibility and reliability of the D2D communication may further be improved.

The method for D2D communication according to the embodiments of the disclosure is described above in combination with FIG. 1 to FIG. 2 in detail, and an apparatus for D2D communication according to the embodiments of the disclosure will be described below in combination with FIG. 4 in detail.

Figure 4:
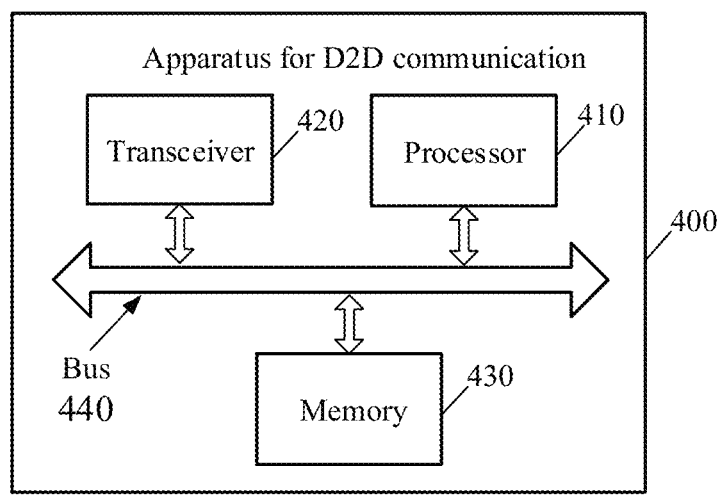
FIG. 4 illustrates a schematic structure diagram of an example of an apparatus for D2D communication according to an embodiment of the disclosure.

FIG. 4 illustrates a schematic block diagram of an apparatus 400 for D2D communication according to an embodiment of the disclosure. As illustrated in FIG. 4, the apparatus 400 includes a processor 410 and a transceiver 420, the processor 410 being connected with the transceiver 420. The apparatus 400 may further include a memory 430, the memory 430 being connected with the processor 410. Alternatively, the apparatus 400 may further include a bus system 440. The processor 410, the memory 430 and the transceiver 420 may be connected through the bus system 440. The memory 430 may be configured to store instructions, and the processor 410 is configured to execute the instructions stored in the memory 430 to control the transceiver 420 to transmit information or a signal.

The processor 410 may be configured to acquire a first time-frequency resource, the first time-frequency resource being a time-frequency resource for transmitting data of a first service and the first service being a D2D communication service.

The processor 410 may be configured to control the transceiver 420 to transmit data of a second service with the first time-frequency resource, the second service being a D2D communication service.

Alternatively, the processor 410 may be configured to determine that a priority of the second service is higher than a priority of the first service.

Or, the processor 410 may be configured to determine that an urgency degree of the second service is higher than an urgency degree of the first service.

Or, the processor 410 may be configured to determine that a service type of the second service belongs to a preset first service type set, wherein the first service type set includes at least one service type.

Alternatively, the processor 410 may be configured to determine a size of a second time-frequency resource, the second time-frequency resource being a smallest time-frequency resource required by transmission of the data of the second service.

The processor 410 may be configured to determine that a size of the first time-frequency resource is larger than or equal to the size of the second time-frequency resource.

Alternatively, the processor 410 may be configured to determine that a transmission manner for the first service is semi-persistent transmission. The first time-frequency resource is specifically a time-frequency resource intended for a next transmission cycle of the first service.

Alternatively, the processor 410 may further be configured to initiate first determination to determine that a first duration is less than or equal to a first preset threshold value. The first duration is a duration from a moment when the first determination is initiated to a starting moment of the first time-frequency resource in time domain.

Alternatively, the processor 410 may be configured to initiate first determination to determine that a first duration is more than or equal to a second preset threshold value. The first duration is a duration from a moment when the first determination is initiated to a starting moment of the first time-frequency resource in time domain.

The processor 410 may be configured to initiate acquisition of a third time-frequency resource.

The processor 410 may be configured to initiate second determination to determine that a second duration is more than or equal to a third preset threshold value. The second duration is a duration from a moment when the apparatus 400 initiates the acquisition of the third time-frequency resource to a moment when the second determination is initiated and the third time-frequency resource is a time-frequency resource for transmitting the data of the second service.

Alternatively, when a transmission manner for the second service is semi-persistent transmission, the processor 410 may be configured to determine that a transmission cycle of the second service is an integer multiple of a transmission cycle of the first service.

Alternatively, the first service may include at least two first services, and the first time-frequency resource may include at least two first time-frequency resources, the at least two first services may correspond to the at least two first time-frequency resources one to one, and each first time-frequency resource may be configured to transmit data of the corresponding first service. The first duration may include at least two first durations, the at least two first time-frequency resources may correspond to the at least two first durations one to one, and each first duration may be a duration from a current moment to a starting moment of the corresponding first time-frequency resource in the time domain.

The processor 410 may be configured to determine a target first service from the at least two first services. The first duration corresponding to the target first service is a shortest duration of the at least two first durations.

The processor 410 may be configured to control the transceiver 420 to transmit the data of the second service with the first time-frequency resource corresponding to the target first service.

Alternatively, the processor 410 may be configured to discard the data of the first service to be transmitted with the first time-frequency resource.

Alternatively, the processor 410 may be configured to acquire a fourth time-frequency resource. Time corresponding to the fourth time-frequency resource is outside a first semi-persistent transmission time range, the first semi-persistent transmission time range is a time range for transmission of the data of the first service and the first semi-persistent transmission time range includes time corresponding to the first time-frequency resource.

The processor 410 may be configured to control the transceiver 420 to transmit the data of the second service with the fourth time-frequency resource.

The apparatus 400 for D2D communication according to the embodiment of the disclosure may correspond to the first terminal device (for example, terminal device A) in the method of the embodiment of the disclosure. Each unit, i.e., module, in the apparatus for D2D communication 400 and the other abovementioned operations and/or functions are intended to implement the corresponding flows in the method 200 in FIG. 2 and will not be elaborated herein for simplicity.

According to the apparatus for D2D communication of the embodiment of the disclosure, the data of the second service is transmitted with the first time-frequency resource which was acquired by the first terminal device in the time domain and was intended for transmitting the data of the first service, so that the terminal device does not have to initiate acquisition of the time-frequency resource for transmitting the second service under the condition that, for example, the second service has a relatively high requirement on a transmission delay, the transmission delay of the second service may be shortened, and flexibility and reliability of the D2D communication may further be improved.

It is to be noted that the method embodiment of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EE-PROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an EPROM, an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer device (which may be a personal computer, a server, network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for Device-to-Device (D2D) communication, comprising:
acquiring, by a first terminal device, a first time-frequency resource, the first time-frequency resource being a time-frequency resource for transmitting data of a first service and the first service being a D2D communication service;
determining, by the first terminal device, a size of a second time-frequency resource, the second time-frequency resource being a smallest time-frequency resource required by transmission of data of a second service;
determining, by the first terminal device, that a size of the first time-frequency resource is larger than or equal to the size of the second time-frequency resource; and transmitting, by the first terminal device, the data of the second service with the first time-frequency resource, the second service being a D2D communication service.

2. The method of claim 1, wherein before the first terminal device transmits the data of the second service with the first time-frequency resource, the method further comprises:
   determining, by the first terminal device, that a priority of the second service is higher than a priority of the first service; or
   determining, by the first terminal device, that an urgency degree of the second service is higher than an urgency degree of the first service; or
   determining, by the first terminal device, that a service type of the second service belongs to a preset first service type set, wherein the first service type set comprises at least one service type.

3. The method of claim 1, wherein before the first terminal device transmits the data of the second service with the first time-frequency resource, the method further comprises:
   determining, by the first terminal device, that a transmission manner for the first service is semi-persistent transmission, wherein the first time-frequency resource is a time-frequency resource intended for a next transmission cycle of the first service.

4. The method of claim 3, wherein before the first terminal device transmits the data of the second service with the first time-frequency resource, the method further comprises:
   initiating, by the first terminal device, first determination to determine that a first duration is less than or equal to a first preset threshold value, the first duration being a duration from a moment when the first determination is initiated to a starting moment of the first time-frequency resource in time domain;
   or,
   initiating, by the first terminal device, first determination to determine that a first duration is more than or equal to a second preset threshold value, the first duration being a duration from a moment when the first determination is initiated to a starting moment of the first time-frequency resource in time domain, initiating, by the first terminal device, acquisition of a third time-frequency resource, and initiating, by the first terminal device, second determination to determine that a second duration is more than or equal to a third preset threshold value, the second duration being a duration from a moment when the first terminal device initiates the acquisition of the third time-frequency resource to a moment when the first terminal device initiates the second determination and the third time-frequency resource being a time-frequency resource for transmitting the data of the second service.

5. The method of claim 4, wherein in response to a transmission manner for the second service being semi-persistent transmission, before the first terminal device transmits the data of the second service with the first time-frequency resource, the method further comprises:
   determining, by the first terminal device, that a transmission cycle of the second service is an integer multiple of a transmission cycle of the first service.

6. The method of claim 4, wherein the first service comprises at least two first services, and the first time-frequency resource comprises at least two first time-frequency resources, the at least two first services correspond to the at least two first time-frequency resources one to one, and each first time-frequency resource is configured to transmit data of a corresponding first service; and the first duration comprises at least two first durations, the at least two first time-frequency resources correspond to the at least two first durations one to one, and each first duration is a duration from a current moment to a starting moment of a corresponding first time-frequency resource in the time domain,
   wherein transmitting, by the first terminal device, the data of the second service with the first time-frequency resource, the second service being a D2D communication service, comprises:
   determining, by the first terminal device, a target first service from the at least two first services, wherein the first duration corresponding to the target first service is a shortest duration of the at least two first durations; and
   transmitting, by the first terminal device, the data of the second service with the first time-frequency resource intended for the target first service.

7. The method of claim 3, further comprising:
   acquiring, by the first terminal device, a fourth time-frequency resource, time corresponding to the fourth time-frequency resource being outside a first semi-persistent transmission time range, the first semi-persistent transmission time range being a time range for transmission of the data of the first service, and the first semi-persistent transmission time range comprising time corresponding to the first time-frequency resource; and
   transmitting, by the first terminal device, the data of the first service with the fourth time-frequency resource.

8. The method of claim 1, further comprising:
   discarding, by the first terminal device, the data of the first service to be transmitted with the first time-frequency resource.

9. A terminal device, comprising:
   a processor; and
   a memory storing instructions, which, when executed by the processor, cause the processor to perform one or more actions comprising:
   acquiring a first time-frequency resource, the first time-frequency resource being a time-frequency resource for transmitting data of a first service and the first service being a D2D communication service;
   determining a size of a second time-frequency resource, the second time-frequency resource being a smallest time-frequency resource required by transmission of data of a second service;
   determining that a size of the first time-frequency resource is larger than or equal to the size of the second time-frequency resource; and
   transmitting the data of the second service with the first time-frequency resource, the second service being a D2D communication service.

10. The terminal device of claim 9, wherein the one or more actions further comprise:
    determining that a priority of the second service is higher than a priority of the first service, or
    determining that an urgency degree of the second service is higher than an urgency degree of the first service, or
    determining that a service type of the second service belongs to a preset first service type set, wherein the first service type set comprises at least one service type.

11. The terminal device of claim 9, wherein the one or more actions further comprise:
    determining that a transmission manner for the first service is semi-persistent transmission, wherein the first time-frequency resource is a time-frequency resource intended for a next transmission cycle of the first service.

12. The terminal device of claim 11, wherein the one or more actions further comprise:
    initiating first determination to determine that a first duration is less than or equal to a first preset threshold value, the first duration being a duration from a moment when the first determination is initiated to a starting moment of the first time-frequency resource in time domain;
    or,
    initiating first determination to determine that a first duration is more than or equal to a second preset threshold value, the first duration being a duration from a moment when the first determination is initiated to a starting moment of the first time-frequency resource in time domain, initiating acquisition of a third time-frequency resource, and initiating second determination to determine that a second duration is more than or equal to a third preset threshold value, the second duration being a duration experienced from a moment when the device initiates the acquisition of the third time-frequency resource to a moment when the device initiates the second determination, and the third time-frequency resource being a time-frequency resource for transmitting the data of the second service.

13. The terminal device of claim 12, wherein, when a transmission manner for the second service is semi-persistent transmission, the one or more actions further comprise:
    determining that a transmission cycle of the second service is an integer multiple of a transmission cycle of the first service.

14. The terminal device of claim 12, wherein the first service comprises at least two first services, and the first time-frequency resource comprises at least two first time-frequency resources, the at least two first services correspond to the at least two first time-frequency resources one to one, and each first time-frequency resource is configured to transmit data of a corresponding first service; and, the first duration comprises at least two first durations, the at least two first time-frequency resources correspond to the at least two first durations one to one, and each first duration is a duration from a present moment to a starting moment of a corresponding first time-frequency resource in the time domain,
    wherein transmitting the data of the second service with the first time-frequency resource comprises:
    determining a target first service from the at least two first services, wherein the first duration corresponding to the target first service is a shortest duration of the at least two first durations; and
    transmitting the data of the second service with the first time-frequency resource intended for the target first service.

15. The terminal device of claim 11, wherein the one or more actions further comprise:
    acquiring a fourth time-frequency resource, time corresponding to the fourth time-frequency resource being outside a first semi-persistent transmission time range, the first semi-persistent transmission time range being a time range for transmission of the data of the first service and the first semi-persistent transmission time range comprising time corresponding to the first time-frequency resource; and
    transmitting the data of the first service with the fourth time-frequency resource.

16. The terminal device of claim 9, wherein the one or more actions further comprise:
    discarding the data of the first service to be transmitted with the first time-frequency resource.

17. A non-transitory computer-readable storage medium, storing instructions, which, when executed by a processor, cause the processor to perform one or more actions comprising:
    acquiring a first time-frequency resource, the first time-frequency resource being a time-frequency resource for transmitting data of a first service and the first service being a D2D communication service;
    determining a size of a second time-frequency resource, the second time-frequency resource being a smallest time-frequency resource required by transmission of data of a second service;
    determining that a size of the first time-frequency resource is larger than or equal to the size of the second time-frequency resource; and
    transmitting the data of the second service with the first time-frequency resource, the second service being a D2D communication service.

18. The non-transitory computer-readable storage medium of claim 17, wherein the one or more actions further comprise:
    determining that a priority of the second service is higher than a priority of the first service, or
    determining that an urgency degree of the second service is higher than an urgency degree of the first service, or
    determining that a service type of the second service belongs to a preset first service type set, wherein the first service type set comprises at least one service type.

* * * * *